June 23, 1931. R. A. A. COUZINET 1,811,304
AIRPLANE
Filed Feb. 15, 1928 12 Sheets-Sheet 3

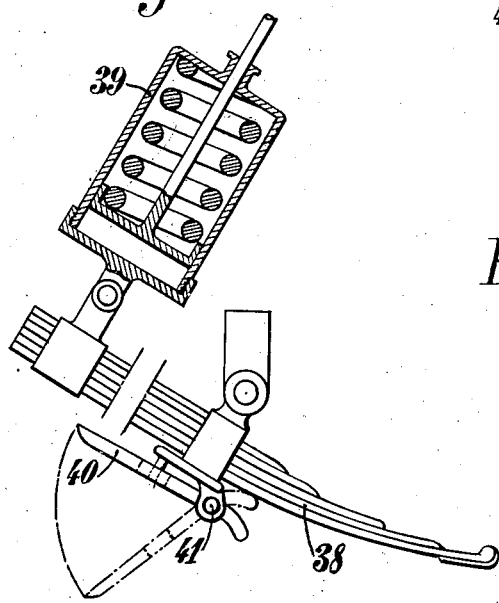
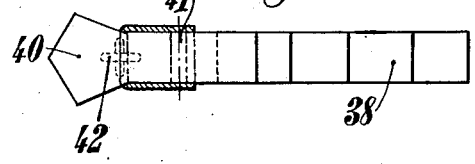
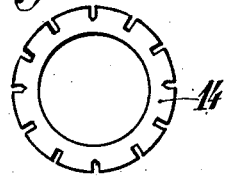
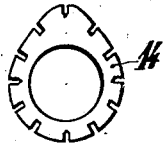
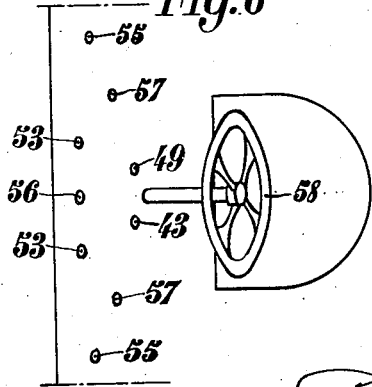
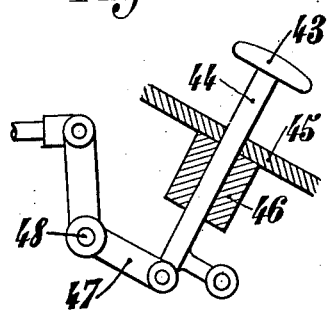
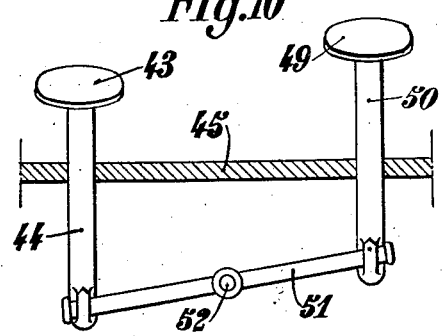

R. A. A. Couzinet
By: Marks & Clark
Attys.

June 23, 1931.  R. A. A. COUZINET  1,811,304
AIRPLANE
Filed Feb. 15, 1928   12 Sheets-Sheet 4
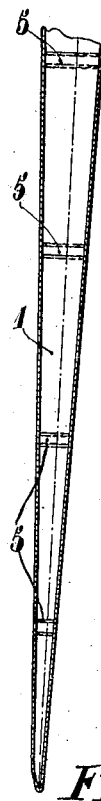
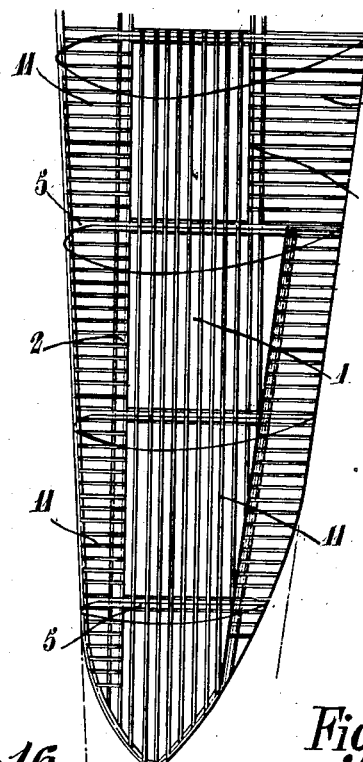
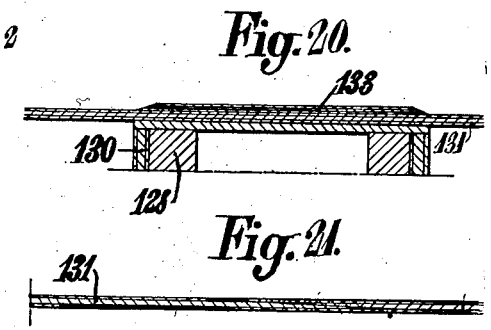
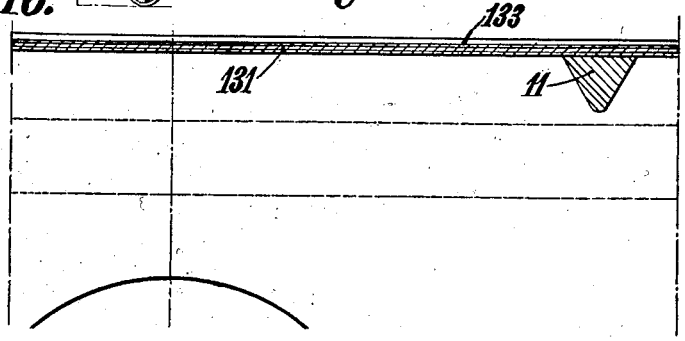
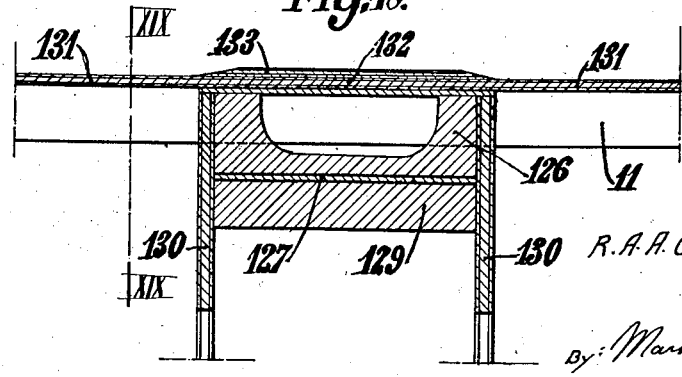

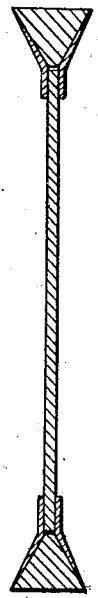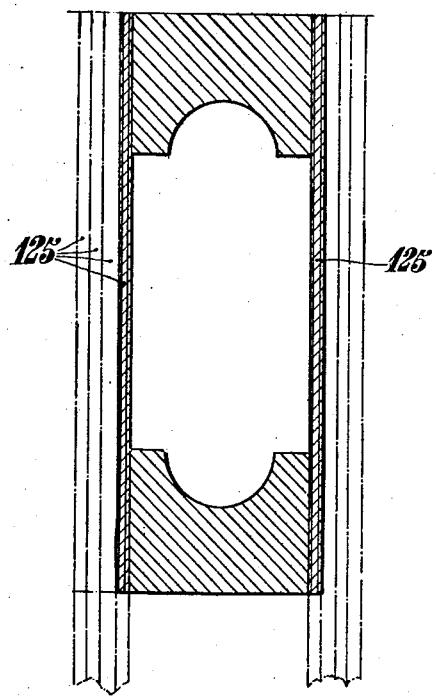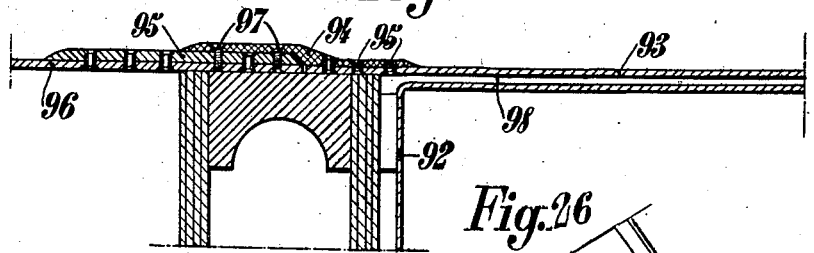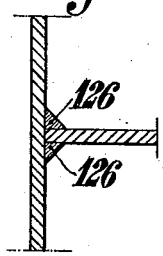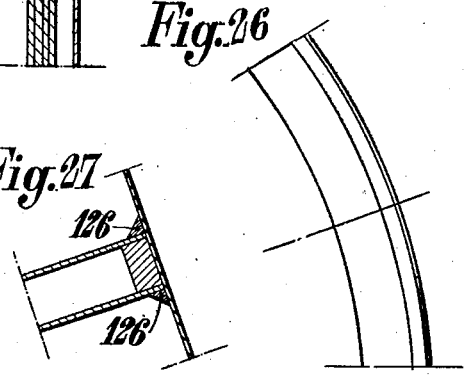

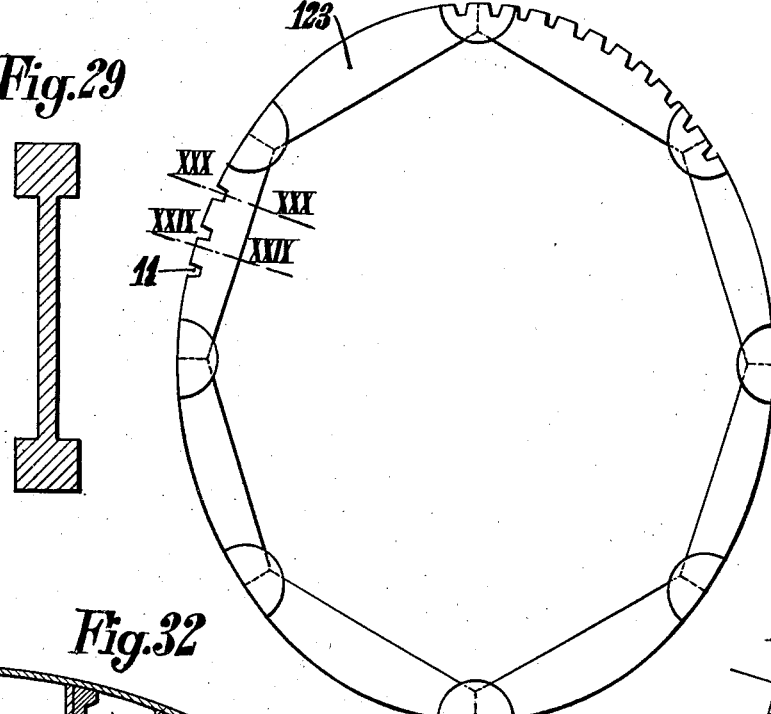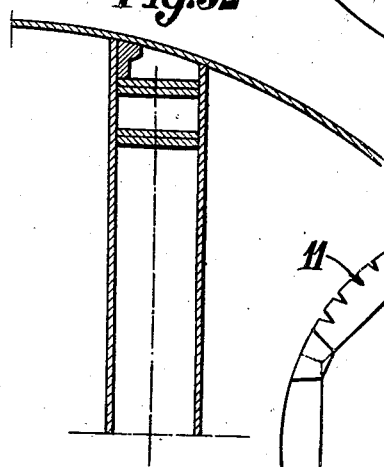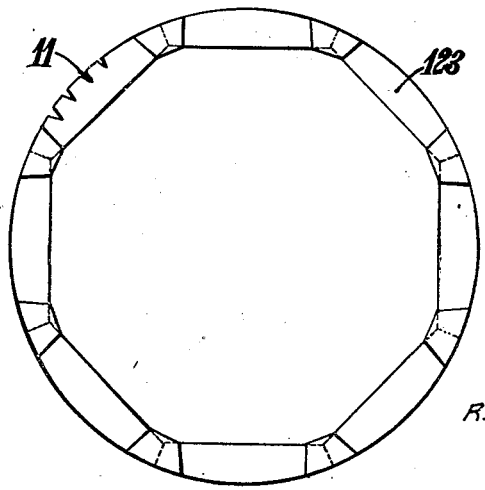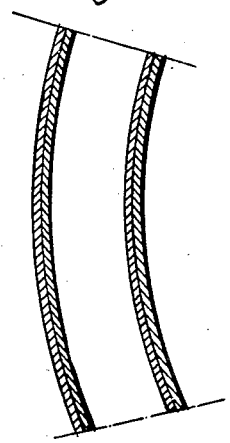

June 23, 1931.  R. A. A. COUZINET  1,811,304
AIRPLANE
Filed Feb. 15, 1928   12 Sheets-Sheet 7
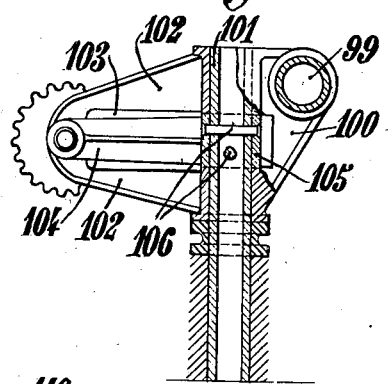
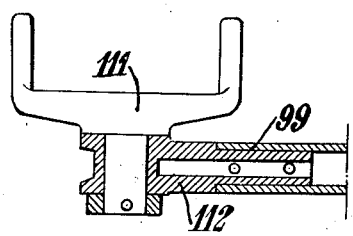
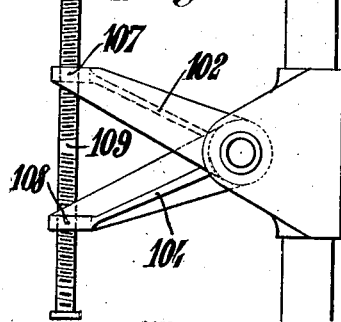
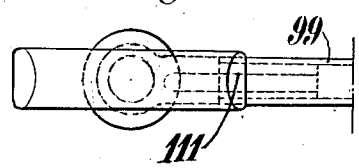
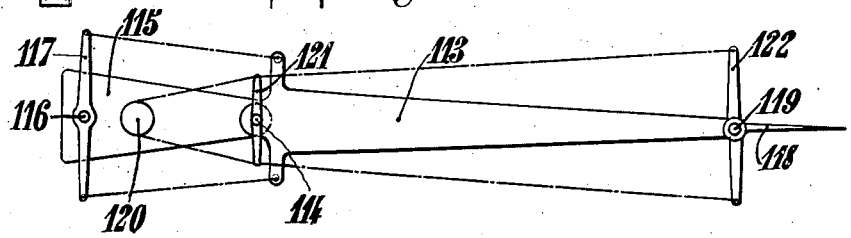
R. A. A. Couzinet
INVENTOR
By: Marks & Clerk
Attys.

June 23, 1931.  R. A. A. COUZINET  1,811,304
AIRPLANE
Filed Feb. 15, 1928  12 Sheets-Sheet 8
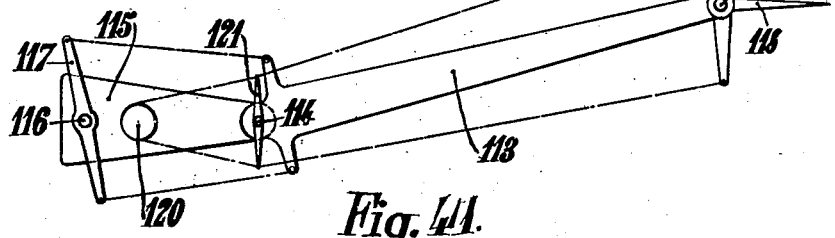
Fig. 40.
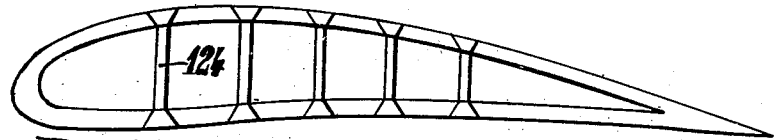
Fig. 41.
Fig. 42.
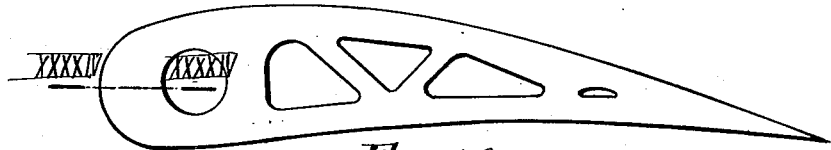
Fig. 43.
Fig. 46.
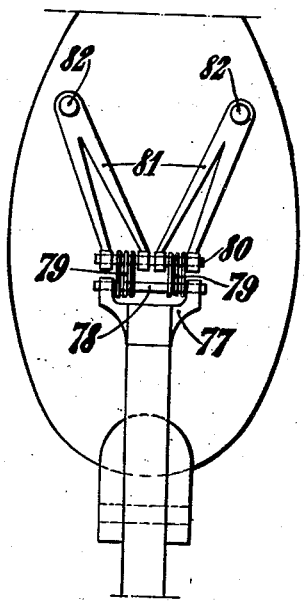
Fig. 44.
R. A. A. Couzinet
INVENTOR

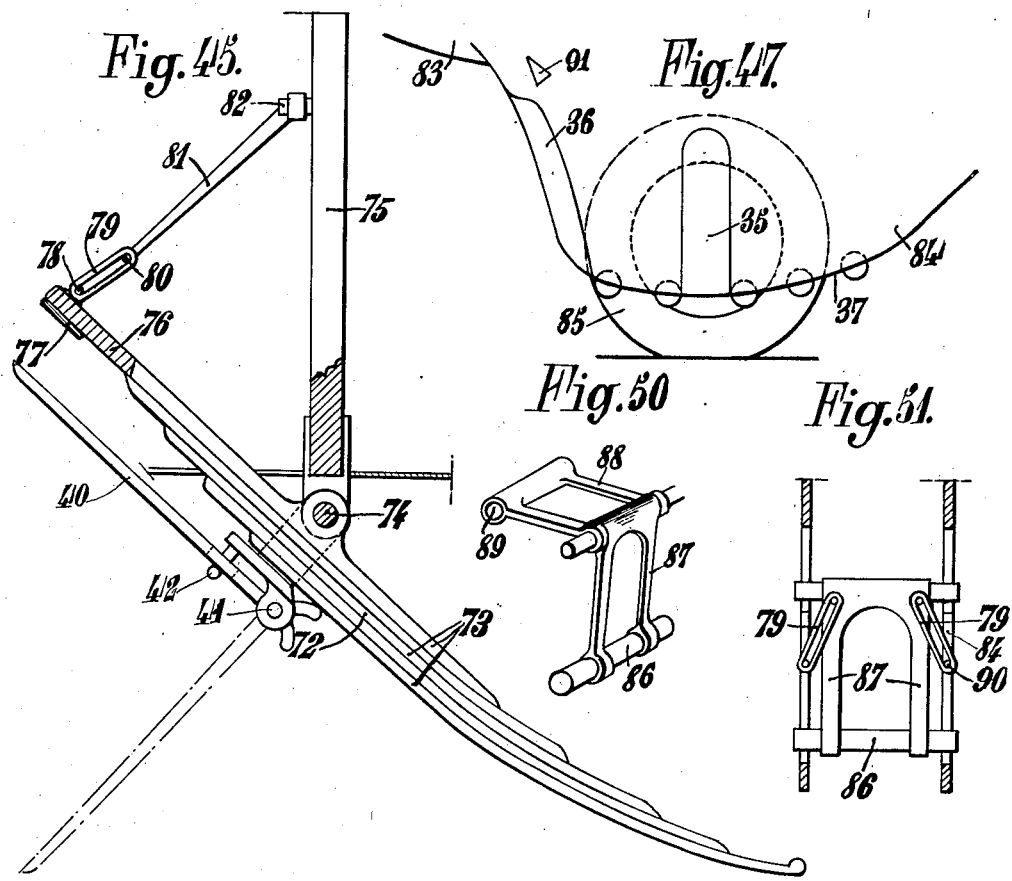
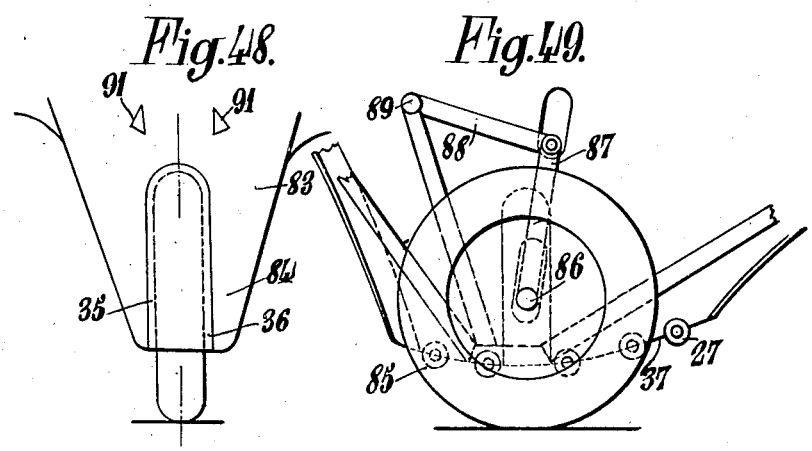

June 23, 1931. R. A. A. COUZINET 1,811,304
AIRPLANE
Filed Feb. 15, 1928   12 Sheets-Sheet 10
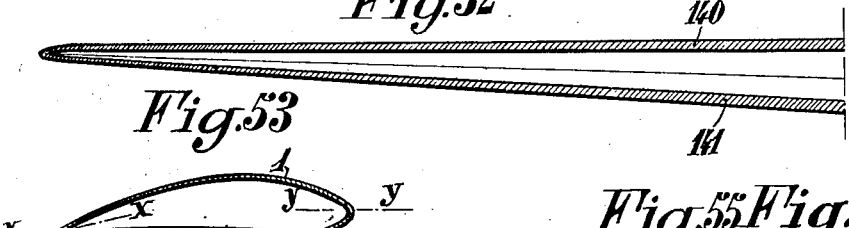
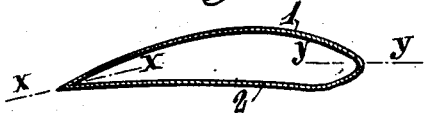
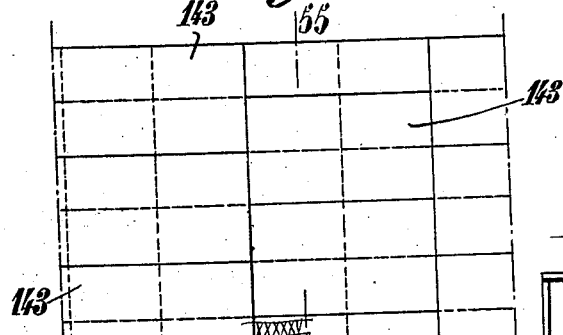
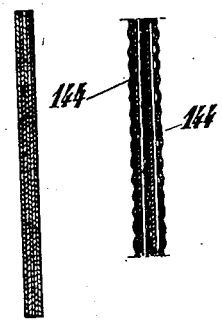
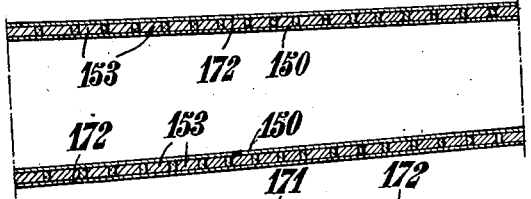
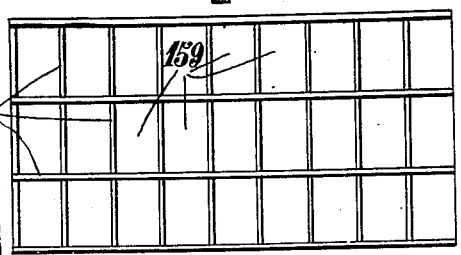
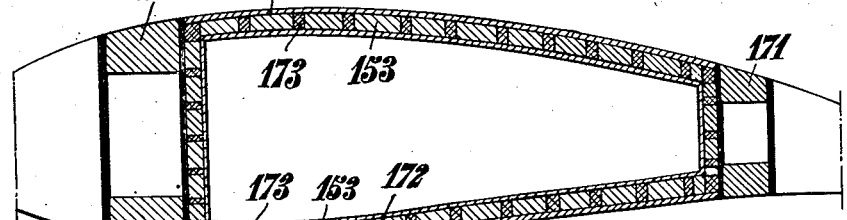
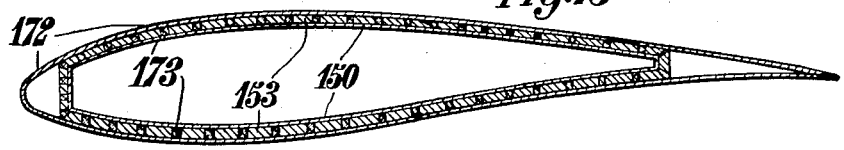
R. A. A. Couzinet
INVENTOR
By: Marks & Clerk
Attys.

June 23, 1931.  R. A. A. COUZINET  1,811,304
AIRPLANE
Filed Feb. 15, 1928   12 Sheets-Sheet 11

R. A. A. Couzinet
INVENTOR
By: Marks & Clerk
Attys.

June 23, 1931. R. A. A. COUZINET 1,811,304
AIRPLANE
Filed Feb. 15, 1928 12 Sheets-Sheet 12
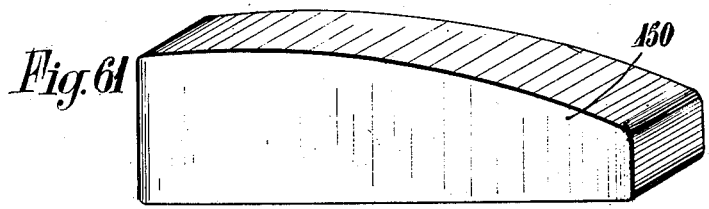
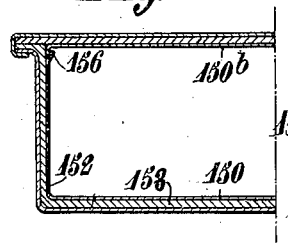
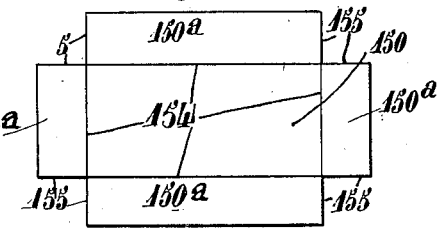
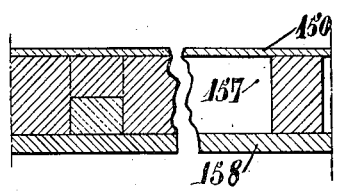
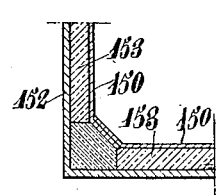
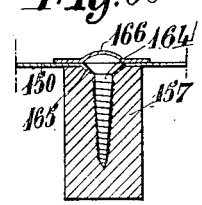
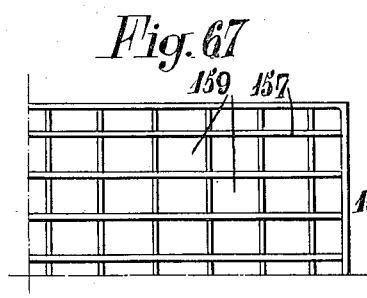
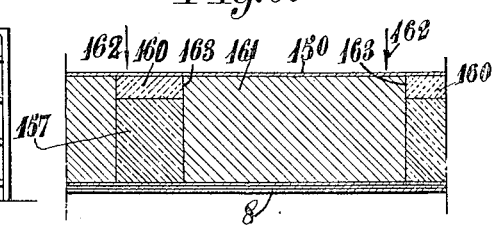
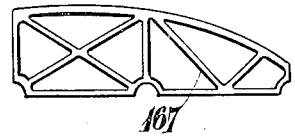
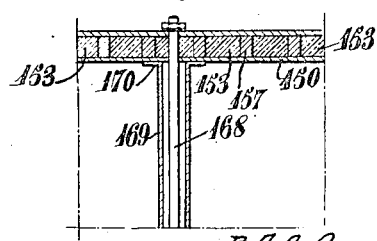

Patented June 23, 1931

1,811,304

UNITED STATES PATENT OFFICE

RENÉ ALEXANDRE ARTHUR COUZINET, OF PARIS, FRANCE

AIRPLANE

Application filed February 15, 1928, Serial No. 254,558, and in France February 26, 1927.

My invention concerns air ships such as airplanes, and has for its main object to improve the construction of these apparatus by causing to participate to the resistance of the whole structure all the elements composing it.

Another object of the invention is to provide an airplane having a very high ratio of drift to lift coefficient, of very large radius of action and capable of reaching high speeds.

A third object of the invention is to provide an entirely fluid-tight airplane, capable consequently of floating on water in case of alighting on the sea.

A form of construction of an improved airplane in accordance with the invention is illustrated, by way of example only, in the accompanying drawings in which:

Fig. 1 is a front view.
Fig. 2 is a corresponding plan view.
Fig. 3 is a side view corresponding to Fig. 1.
Fig. 4 is an elevation of the tail skid provided with a braking spade.
Fig. 5 is a corresponding partial plan view.
Figs. 6 and 7 are front view of transverse frames.
Fig. 8 is a plan view of the floor of the pilot's cockpit.
Fig. 9 is an elevation of a control device actuated by a pedal.
Fig. 10 is a corresponding left-hand side-view.
Fig. 11 is a sectional elevation of the control wheel.
Fig. 12 is a corresponding side view.
Fig. 13 is a corresponding plan view.
Fig. 14 is a cross section of the wing.
Fig. 15 is a section of a rib of the empennage.
Fig. 16 is a longitudinal section of a wing.
Fig. 17 is a corresponding plan view.
Fig. 18 is a cross section, on a large scale, of the upper part of a hollow rib provided with its covering.
Fig. 19 is a section made according to line 19—19 of Fig. 18.
Figs. 20 and 21 are constructional modifications of the connection of two covering parts.
Fig. 22 is a cross section of a small inner connecting plate.
Fig. 23 is a longitudinal section of a spar.
Fig. 24 is a cross-section made at the point of connection of a detachable part of the covering.
Figs. 25, 26 and 27 show in elevation and section buttressing devices.
Fig. 28 is an elevation of a transverse frame.
Fig. 29 is a section made according to line 29—29 of Fig. 28.
Fig. 30 is a section made according to line 30—30 of Fig. 28.
Fig. 31 is an elevation of a constructional modification of a transverse frame.
Fig. 32 is a cross section of a transverse frame provided with its covering.
Fig. 33 is a section made according to line 33—33 of Fig. 32.
Fig. 34 is an axial section of the double adjustable rudder bar.
Fig. 35 is a corresponding plan view.
Fig. 36 is an axial section of the mounting of a footrest on the rudder bar.
Fig. 37 is a corresponding plan view.
Figs. 38, 39 and 40 are diagrammatic plan views of a compensating device.
Fig. 41 is a diagrammatic elevation of a false rib.
Fig. 42 is a plan view of a curved wooden element.
Fig. 43 is a diagrammatic elevation of a hollow rib.
Fig. 44 is a section made according to line 44—44 of Fig. 43.
Fig. 45 is an elevation of the tail skid and of its suspension device.
Fig. 46 is a corresponding side view.
Fig. 47 is an elevation of the landing chassis.
Fig. 48 is a corresponding side view.
Fig. 49 is a section made according to line 49—49 of Fig. 48.
Fig. 50 is a perspective view of the device for mounting the wheel.
Fig. 51 is a corresponding side view.

Fig. 52 is a longitudinal section of another form of construction of a wing.

Fig. 53 is a cross section of the wing shown in Fig. 52.

Fig. 54 is a plan view of a covering part.

Fig. 55 is a section made according to line 55—55 of Fig. 54.

Fig. 56 is a section of another form of construction of a waved covering.

Fig. 61 is a perspective view of a tank.

Fig. 62 is a longitudinal section of the said tank.

Fig. 63 is a plan view showing the cutting of a metal plate or sheet.

Fig. 64 is a partial section, on an enlarged scale, of a tank provided with a wooden armature.

Fig. 65 is a section of an angle assembly.

Fig. 66 is a section of a detail of construction.

Fig. 67 is an elevation of a portion of armature.

Fig. 68 is a partial section of another form of construction of a tank.

Fig. 69 is a longitudinal section of a bracing device.

Fig. 70 is an elevation of an inner reinforcing rib.

Fig. 71 is a cross section of an airplane wing.

Fig. 72 is a corresponding partial plan view.

Fig. 73 is a cross section of another airplane wing.

Fig. 74 is a longitudinal section of an airplane wing.

Figure 1:
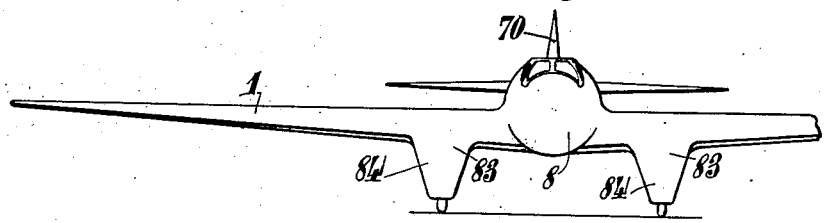

None of the airplanes constructed up to this day has united all the required advantages of ratio of drift to lift coefficient, of security and of comfort. The airplane, forming the subject-matter of this invention, allows, owing to its particularities of construction, to remedy certain of the inconveniences existing on airplanes in service.

The wings 1 of the airplane are provided with spars 2 constituted by side members 3 and top and bottom members 4. The ribs 5 are inserted in the spars 2 and are provided with webs 6 in which are formed orifices 7. The spars 2 are made either in two parts connected adjacent to the axis of the hull 8 of the airplane, or, preferably, in one piece so as to constitute a beam-wing. A member 9 forms the leading edge of the wing 1. In a construction in which use is made of wood, the various elements can be assembled in certain cases by means of screws allowing a rapid taking to pieces and re-setting up. However, in the example described and illustrated, the various wooden elements are glued together. The spars 2, ribs 5, leading edge 9, and trailing edge 10 are rendered rigid together, owing to elements constituted by narrow strips 11 which are arranged in the direction of the spars 2 in the central region of the wing and at right angles to the spars 2 in the region of the leading edge 9 and of the trailing edge 10. The strips 11 can also be arranged in any suitable manner, so as to present externally the appearance of a net-work. The narrow strips 11 are secured on the spars 2, ribs 5, leading edge 9 and trailing edge 10 by screwing, glueing or any equivalent means. The covering 12 is in the case of a construction utilizing wood as that described and illustrated, constituted by ply-wood strips 12 secured on the strips 11. The empennage 13 is obtained by means of construction identical with those described for the wing 1. The framework of the fuselage is obtained by the assemblage of the transverse frames 14 and of the spars 15. The covering of the fuselage is constituted by ply-wood secured on the spars and transverse frames. These latter have webs also made of ply-wood. The ply-wood used as covering renders all the parts of the framework of the airplane rigid together, and contributes to the resistance of the whole. It is obvious that the form of construction described and illustrated, which is characterized in that the framework of the airplane has the general appearance of a net-work on which is secured a covering contributing to the resistance of the whole, can be used in an identical manner for a wooden structure, as that described, or for a compound structure of iron and wood, or for an entirely metallic structure and in this case, the covering would be constituted by duralumin plates for instance.

Figure 11:
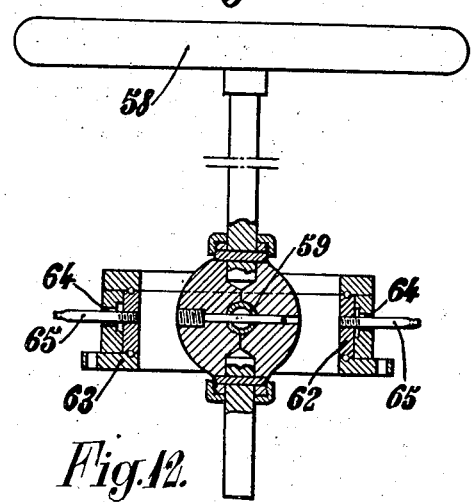
Figure 12:
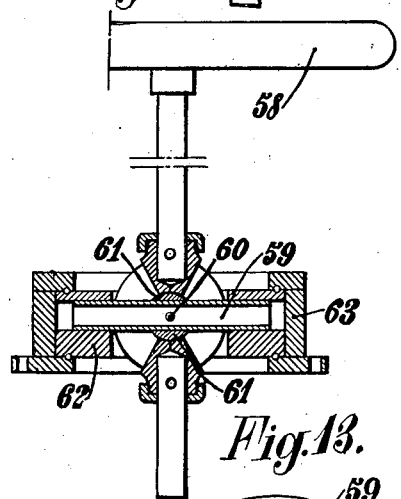
Figure 13:
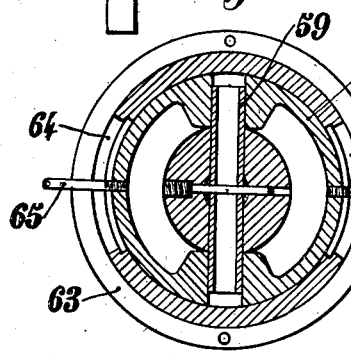
Figure 14:
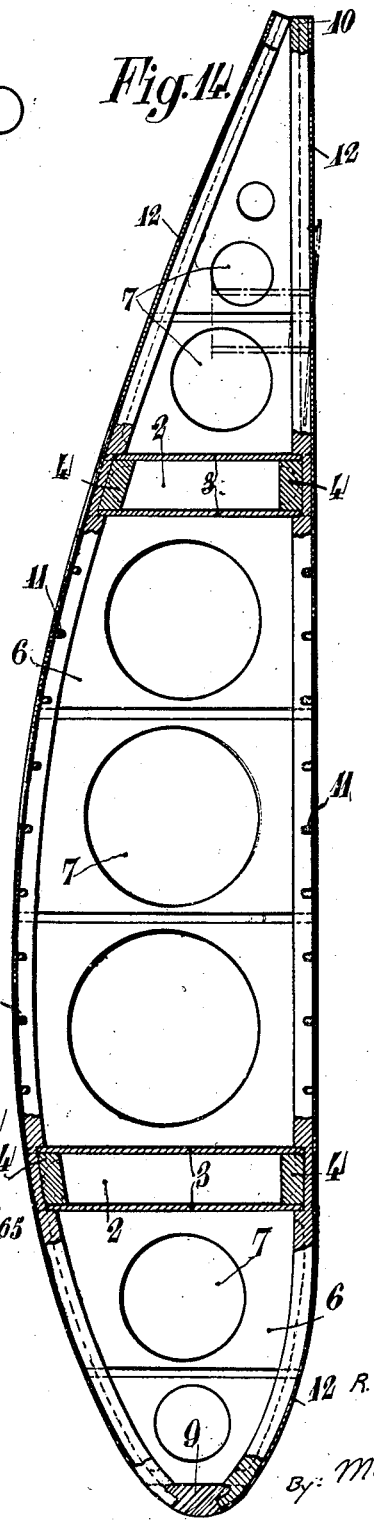
Figure 15:

As shown in Fig. 4, the tail skid 38 is composed of a leaf spring 38 provided moreover with a resilient member 39 diagrammatically illustrated in the form of a spring box 39. The tail skid 38 is preferably provided with a spade 40, pivoted at 41 and which can be released by the rotation of the bolt 42. The spade 40 brakes the airplane to the ground in the case of a long landing. It is obvious that the braking spade 40 might be directly secured on the hull 8 and more particularly at the center of gravity of the airplane, through the medium of a pivoted lever. In any case, the braking spade 40 is controlled by the pilot. The airplane is provided with members for the control of the admission of gasoline to the carburettor, of the contacts etc., as those actually used on airplanes, or of special control members actuated by means of the feet, or of the combination of control members actuated by means of the feet and of the hands. The operation by means of the feet can be effected by a steering control which will be described hereinafter and which suppresses the rudder bar used on airplanes for the control of the rudder. The airplane described and illustrated by way of example only is provided with double controls which can be actuated either with the hands or with the feet. The control device actuated by the feet is constituted (Figs. 8, 9, 10) by means of pedals controlling suitably arranged levers or contacts. Figs. 9 and 10 illustrate in elevation and left-hand side view the foot actuated control for the admission of gasoline to the carburettor. A pedal 43 is provided with a rod 44 passing through the floor 45 and entering a friction box 46 holding the rod 44 in the desired position obtained by the action of the foot on the pedal 43. The rod 44 controls, through the medium of a lever 47, pivoted at 48, the admission of gasoline in the carburettors. The pedal 43 is combined with another pedal 49 rigid with a rod 50 connected to the rod 44 through the medium of a lever 51 pivoted at 52. By acting on the pedal 49, the pedal 43 is brought back to its initial position corresponding to a minimum admission of gasoline causing the engine to work at slow speed. All the other controls, air (pedals 53), contacts (pedals 55), braking spade (pedal 56), fire extinguishers (pedals 57) are obtained in a similar manner to that previously described for gasoline. Fig. 8 shows the arrangement on the pilot's board of the control pedals. A wheel 58 for the control of the steering members is illustrated in Figs. 11, 12 and 13. The wheel 58 actuates a device of the Cardan type, which allows the warping movement of the wing flaps by its pivoting movement about the axis 59 and the actuation of the elevator by pivoting movement about the point 60, owing to a spherical member 61. The axis 59 is rigid with a crown or ring 62 guided in a support 63 in which are provided openings 64 allowing the passage of rods 65 rigid with the crown or ring 62. Angular displacements corresponding to those of the wheel 58 are imparted to the rods 65 by rotation of the wheel 58 about its axis. These angular displacements are transmitted to the rudder by cables attached to the ends of the rods 65 constituting a rudder bar. This arrangement allows to adopt the foot controls previously described. The pilot, at the time of a landing, can, on the one hand, regulate the speed of his engine by means of the feet and, on the other hand, firmly hold his control wheel 58. After having regulated the speed of his engine, the pilot can ensure the steering of his machine solely by means of the control wheel 58.

The drift plane 70 is constituted by the extension of the fuselage 8 the rear transverse frames of which are progressively distorted. This arrangement does away with the head resistances of the external members connecting the drift plane to the fuselage and allows of diminishing the weight of the airplane, by dispensing with the inner connections which are very important owing to the overhanging arrangement of the drift plane between the stern frame and the fuselage. By constituting the drift plane by means of a suitable extension of the fuselage, the ratio of drift to lift coefficient of the airplane is increased and the architectural appearance of the latter is improved.

Another form of construction of a tail skid is illustrated in Figs. 45 and 46 in which a tail skid 72 is pivoted about an axis 74 rigid with a rear transverse frame 75. An extension 76 of the tail skid 72 is provided with a fork piece 77 in which extends an axis 78 connected, through the medium of sandows 79 in the shape of rings, to another axis 80 extending in fork pieces 81 pivoted at 82 on the transverse frame 75. A braking spade 40, identical with that illustrated in Fig. 4 is mounted on the tail skid 72. The airplane described and illustrated is of the three-engine type, but it is obvious that the number of engines can vary. In the form of construction described, the extension of the side frames 83 supporting the engines are used as struts or stays for the landing chassis. The head resistance of the airplane is diminished owing to the union of the frames 83 with the landing chassis. The gauge of the latter is, by means of this arrangement, considerably increased and ensures from this fact a greater stability during flying off or landing.

Each wheel 85 of the landing chassis is arranged within the streamline casing 84 constituted, as stated, by the extension of the side frames 83. The wheels 85 have a greater diameter than those actually used; they allow the airplane to more easily pass over the obstacles it encounters when running on the ground. These wheels are independent and are each pivoted about an axle 86 rigid with a sliding frame 87 connected at its upper part to an arm 88 pivoted about an axis 89. The suspension of each wheel is ensured by resilient members and, in particular by ring-shaped sandows 79 secured, on the one hand, to a fixed part 90 of the landing chassis 84 and, on the other hand, either to the frame 87, or to the arm 88.

The landing chassis can also be secured in position; in this case it is secured to the side frames 83 through the medium of hinge elements some of which are rigid with the frame and the others with the landing chassis; the connection between the hinge elements being ensured by spindles which can be removed during flying. This arrangement allows the landing chassis to drop and ensures the alighting in better conditions, in case the airplane should be compelled to alight on a sheet of water. Independently of the above mentioned combinations the landing chassis can be connected by a cable secured either to the center of gravity, or to the rear part of the airplane. In this case, the landing chassis being loose, is used as braking member, avoiding overturning in case of forced alighting. This arrangement avoids at the same time the loss of the landing chassis.

The fuselage which can be cut away at its junction with the wing, is laid on the latter. The fuselage is rendered rigid with the wing by means of iron fittings and bolts allowing a rapid assemblage and separation.

Actually, serious difficulties are met with for towing a heavily loaded airplane. The airplane described and illustrated is provided with coupling means (not shown) secured to the struts of the landing chassis and within the latter. The coupling members are accessible through apertures provided in the covering of the landing chassis, the said apertures being closed by shutters 91 automatically returned in position.

Side openings 35 provided in the casing 84 allow to remove the axis 86 and to release the wheel 85. The latter can be removed from its casing 84 through an opening 36 provided at the front part of the latter. The lower part 37 of the landing chassis is bulged so as to constitute a shoe in case a tyre should burst or a wheel should collapse. The part 37 of emergency shoe can be rendered more efficient owing to rollers 27 arranged as illustrated in Figs. 47 and 49.

Figure 57:
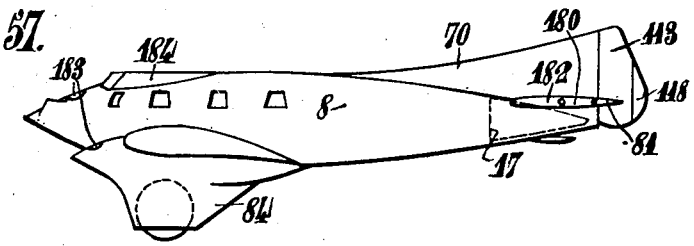
Fig. 57 is a diagrammatic view showing the position of a rear balancing tank.

The coverings of the wings and fuselage are preferably constituted by glued or nailed ply-wood, as described later on. These coverings are fluid-tight and allow the airplane to perfectly float on water in case of forced alighting. A balancing casing 17 is arranged at the rear of the fuselage and can be instantaneously filled up for partly balancing the weight of the engines (Fig. 57).

The weight of the tanks is balanced on the wheels 85 of the landing chassis, in order that the airplane may rapidly come in flying off line, in its position of ratio of drift to lift coefficient most favorable for taking, in a very short space, the speed necessary for flying off. The wheels 85 of large diameter also facilitate a rapid flying off. The tanks are arranged in the wings and can be rapidly emptied, either separately or in totality, by means of a siphon and compressed gas device.

The covering opposite the tanks is detachable and allows to remove the latter from the wing. A form of construction of detachable covering is more particularly illustrated in Fig. 24, in which the tank is shown at 92.

The detachable covering 93 is provided with a frame 94 which is permanently secured on the covering 93 by rivits 95 for instance. This frame 94 takes a bearing on a second frame 95ª rigid with the non-detachable covering 96. The connection between the frames 94 and 95 is obtained by means of screws 97. The covering 94 which comprises an upper part of the wing included between the main spars and hollow ribs is internally provided with strips 98 similar to the strips 11. The engine cowls are in one piece and can be removed without necessitating the removal of the hub caps of propellers. The engines can be repaired whilst flying; they are each arranged in a chamber communicating, through an inspection passage provided in the wing, with the fuselage. The engines, besides the ordinary starters, can be provided with starting cranks arranged within the wing. The steering of the machine is ensured in the example described and illustrated, either by the device shown in Figs. 8 to 13, or by two rudder bars (Figs. 34, 35, 36 and 37). The upper rudder bar 99, which is the only one shown, is actuated by the pilot. The other rudder bar (not shown in the drawings) is connected to the king-posts of the rudder. The angular connection between these two rudder bars is obtained by an adjustable device allowing to vary the angular position of the rudder bars relatively to each other. For that purpose, the rudder bar 99, which is rigid with a forkshaped member 100, is pivoted on a tube 101 on which is rigidly secured the rudder bar controlling the king-posts of the rudder. The fork 100 is provided with a ribbed arm 102 recessed at 103 in its central region. Another ribbed arm 104 which can enter the recess 103 is rigid with a sheath 105 secured, for instance by rivets 106, on the tube 101. Internally screw-threaded holes 107 and 108 are provided at the ends of the arms 102 and 104. A right handed and left handed screw 109, entering the holes 107 and 108, renders the arms 102 and 104 angularly rigid together, the arm 102 being in its turn rigid with the rudder bar 99 and the arm 104 being rigid with the operating tube of the other rudder bar. The angular position of both rudder bars relatively to each other is determined by the position of the screw 109 which is provided with an operating knob. The screw 109 might be screwed in small pulleys pivoted on the ends of the arms 102 and 104. This adjusting device allows, in case of stoppage of one of the side engines, to bring the rudder bar actuated by the pilot back to the normal position whilst leaving the rudder inclined in the suitable position. The rudder bar is moreover provided with foot-rests 111 which are journalled either on the rudder bar 99 or on members 112 secured at the ends of the rudder bars 99. Figs. 38, 39 and 40, diagrammatically illustrate a device for compensating the rudder and balancing the airplane in case of stoppage of a side engine. The rudder 113 is pivoted about an axis 114. The member 115 diagrammatically illustrates the fixed part of the airplane on which is pivoted at 116 a rudder bar 117 actuated by the pilot. A second rudder 118 of reduced surface is pivoted at 119 on the free end of the rudder 113. Both axes 114 and 119 are preferably parallel. The second rudder 118 can be actuated, independently of the first one by a control wheel 120 actuated by the pilot. An intermediate rudder bar 121 is interposed between the control wheel 120 and the king-posts 122 of rudder 118. This device operates in the following manner:

When it is desired to compensate the stoppage of one of the side engines without acting on the rudder bar 117, the control wheel 120 is moved so as to bring the rudder 118 in a suitable position laterally balancing the airplane. Such a position is more particularly shown in Fig. 39. When the pilot acts on the rudder bar 117, the main rudder 113 angularly moves about the axis 114 and the secondary rudder 118, owing to its connection with the rudder bar 121, angularly moves about the axis 119, but in reverse direction to the first one, thus ensuring the automatic compensation of the rudder. Such a position is more particularly shown in Fig. 40. The connections between the various rudder bars and king-posts are constituted either by double cables, or by tension and compression tubes.

The false transverse frames are constituted by independent elements rendered rigid together at their end and forming a framework of suitable shape. Figs. 28 to 31 illustrate forms of construction of various transverse frames obtained as just stated by the juxtaposition of elements 123. The connection between these various elements is obtained by means of any suitable device. Transverse frames thus constituted simplify the construction by avoiding the bending of the wooden members. The various elements 123 are recessed as shown on an enlarged scale in Fig. 29.

Figs. 32 and 33 illustrate the assemblage of the covering on the main transverse frames. The transverse frames are connected by narrow strips 11 which constitute with the transverse frames and the false transverse frames the framework of the fuselage which has exteriorly the appearance of a checkerwork or network covered with a covering which renders the various elements rigid together and contributes to the resistance of the whole. The ribs can be realized in the same way as the transverse frames. Fig. 41 shows a false rib in which struts 124 ensure the connection between the lower and upper parts of the rib. The assemblage of the struts 124 can be effected as illustrated in Fig. 22. The spars are constituted by hollow girders or beams of equal resistance which are obtained (Fig. 23) by superposition of plywood strips 125, the number of which decreases from the central portion to the ends. The various elements of the framework are buttressed as shown in Figs. 25, 26 and 27 by means of members 126.

The bending of wooden members (Fig. 42) is obtained owing to a momentary separation between certain fibres so that, during bending, the fibres easily slide on each other. The separation of the fibres is realized, for instance, by saw cuts of suitable length. The fibers, which are separated, are rendered rigid together after bending, either directly by gluing, or by interposing between them resistant strips 126 preferably constituted by ply-wood.

Fig. 43 illustrates a hollow rib obtained by the above mentioned bending method. The various constituent elements of a hollow rib are more particularly illustrated in Fig. 18 in which a ply-wood strip 127 is interposed between two elements 128 and 129. This ply-wood strip avoids the complete rupture of the web of the girder in case a slit occurs either in the member 128 or in the member 129. The sides of such a hollow rib are constituted by ply-wood strips 130. The various elements of the covering 131 are arranged end to end at 132, the junction being covered with a ply-wood strip 133. The union of the various elements of the covering can be also effected as shown in Fig. 20. In the longitudinal direction of the wing, the union of the ply-wood strips is effected through a bevelled portion and in a suitable direction relatively to the direction of movement of the airplane.

The airplane wing can be solely constituted by ribs rendered rigid together by suitably arranged narrow strips 11 so that the exterior of the framework has the appearance of a checker-work or net-work on which is secured the covering which constitutes the main element of resistance and is obtained by the superposition of ply-wood or like strips connected by gluing for instance and the number of which decreases from the central portion to the ends so as to provide a beam or girder of equal resistance.

The method of manufacture which consists in realizing the framework of the airplane so as to externally constitute a network on which is secured the covering which renders the various elements rigid together and contributes to the resistance of the whole can be used in the same way for a metal or wooden structure.

Figs. 52 and 53 illustrate, in longitudinal and cross-sections, the section of an airplane wing made in two parts 140 and 141 joined by soldering according to lines x—x and y—y. For airplanes of small span, these members 140 and 141 can be obtained by drawing of a light metal such as duralumin. The hull can also be made in two parts joining in the middle vertical longitudinal plane. This form of construction is more particularly convenient for airplanes of small dimensions, such as chasers or scouts. The preferred form of construction of the covering indifferently applying to small and large airplanes, is that illustrated in Fig. 54. In this case, the net-work or checker-work is constituted by crossed strips which constitute at the same time the framework and the covering. Overlapping wooden sheets or plates 143 are superposed and glued together, the various layers or plies being displaced so that each portion of the covering participate to the resistance of the whole. Another form of construction, illustrated in Fig. 56, is obtained by the superposition of waved sheets 144 arranged at right angles or obliquely relatively to each other.

The fluid-tightness of the tanks and particularly of those used on airplanes must be perfect. For that purpose, each tank 150 of the airplane forming the subject-matter of the present invention (Fig. 61) is provided with an outer armature 152 of any suitable shape. A fluid-tight material 153 which preferably cannot be destroyed by the contents of the tank 150, is interposed between the latter and the outer armature 152. As intermediate material 153, use can be made of the products of condensation of phenols. The walls of the tank 150 have a thickness smaller than those of ordinary tanks. These walls are provided with an inner lining in case the contents of the tank would be capable of attacking the said walls. The material 153 in case of perforation of the tank 150 retains the liquid and localizes the leakage. The covering 152 constituting an armature is preferably fluid-tight. The covering 152 and the material 153 protect the inner tank 150 and prevent all accidental perforations during the manipulation of the said tank.

Figure 60:
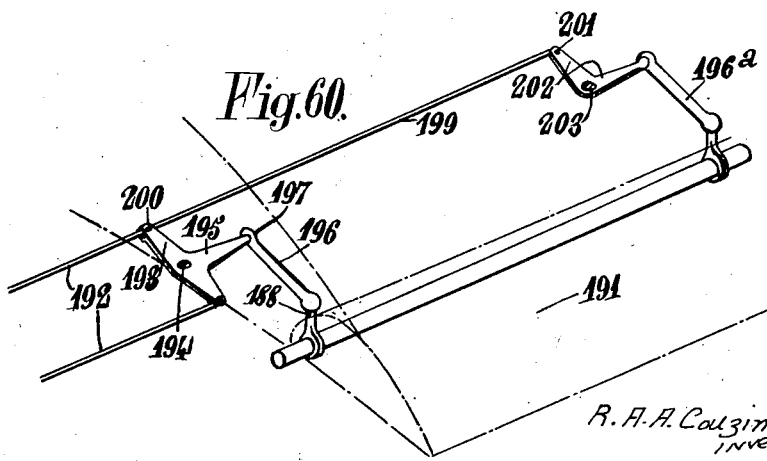
Fig. 60 is a diagrammatic view of the control for the wing flaps.

In one of the forms of construction of such a tank, a metal sheet 150 is cut out for instance as indicated in Fig. 60. The sides 150ª which are raised according to the lines 154 are soldered on the edges 155. The upper part 150ᵇ which forms a cover, fits over the tank 150 and is rendered rigid with the latter by soldering, or like attaching means. A filling up orifice and a plug for closing the same are provided on the tank 150. An entirely soldered tank in which no rivet is used is thus obtained. The tank 150 thus constituted is provided with an armature 152 having externally the appearance for instance of a checker-work or net-work 157.

Fig. 67 shows such a covering which in its turn is covered by ply-wood 158. The material 153 is arranged between the sheet 150 and the net-work 157 and in the cavities 159 of the latter. It is possible to use as material 153 (Fig. 68) cork plates 160 and 161. The liquid contained in the tank 150 exerts a certain pressure perpendicular to the walls. This pressure is transmitted to the cork plates 160 and 161 which are compressed and ensure by their expansion the fluid-tightness of the joints 163. The outer casing is constituted by ply-wood which, moreover, can be internally provided with an impervious varnish.

Fig. 65 shows an angle connection.

Fig. 66 illustrates means for partially rendering the tank 150 rigid with the armature of the latter. These means are constituted by a point 164 which perforates, when placed in position, the sheet 150 and ensures the fluid-tightness of the perforation by wedging of the edges 165, a small plate 166 can be soldered, as shown in Fig. 66, for holding the point 164 and ensuring, in combination with the wedging of the edges 165, the fluid-tightness of the perforation formed in the sheet 150. As shown in Fig. 70, stays 167 are arranged in the tank 150 and are soldered to the walls of the latter. In the case of a tank of large capacity, which would necessitate a considerable increase of the weight of the outer armature for ensuring the rigidity of the said tank, when it is full of liquid, the tank is stayed by rods 168 (Fig. 69) which pass through tubes 169 arranged within the tank 150 and secured on the latter through the medium of flanges 170 soldered on the inner walls of the tank 150.

Tanks are thus obtained which do away with any danger of important leakage and the weight of which is, in certain cases, for the same capacity, smaller than those of the tanks actually in use.

The ply-wood 158 can be externally covered with canvas. The covering 153 which is made of any suitable material can, for instance, be constituted by interwoven rubber strips. These latter can be combined with a cork covering. Such an arrangement ensures the fluid-tightness of the tank in case the latter should be perforated for instance by a bullet.

The outer armature 152, in the example illustrated in Figs. 71 to 74 is constituted by the framework of the wing of an airplane. The beams or girders 171 and the covering 172 in combination with strips 173 form the armature of the tank. The latter is internally constituted as previously indicated by a tank 150 made of thin sheet-iron. The strips 173 form a checker-work or net-work 173. An impervious material 153, constituted for instance by cork, is arranged as indicated in Fig. 68.

The cork and the tanks 150, which can be instantaneously emptied, are used for holding the airplane afloat in case of forced alighting of the latter. Fig. 73 shows a form of construction of a wing in which the spars 171 are dispensed with.

Figure 2:
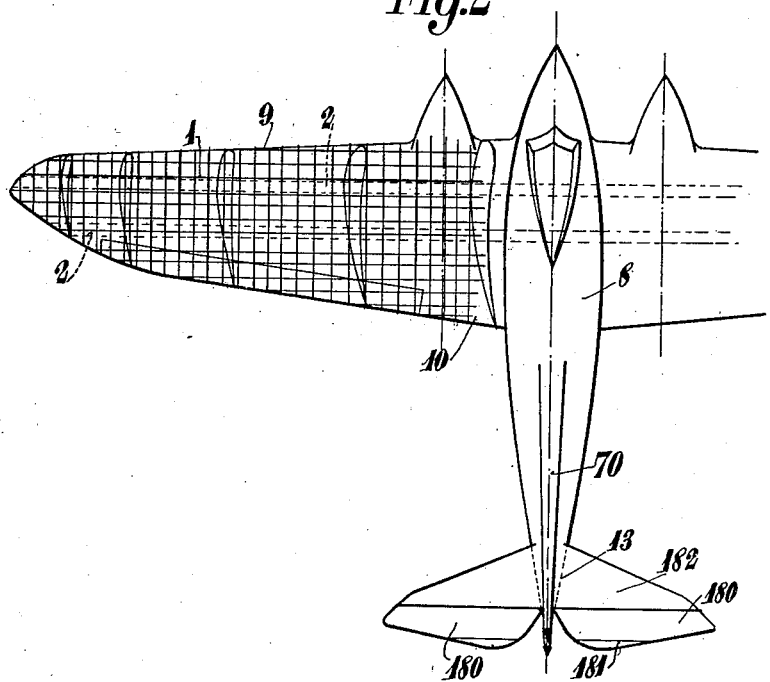
Figure 3:
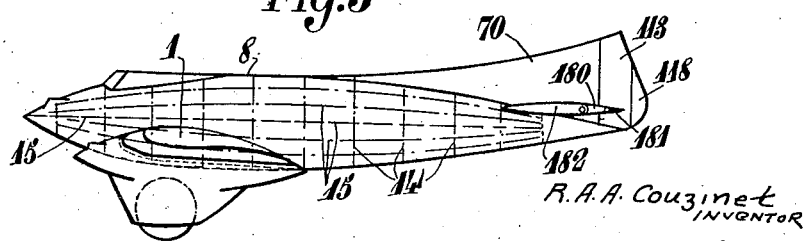

The airplane, forming the subject-matter of the present invention, comprises other particularities. The elevator 180 (Figs. 2 and and 57) is provided with a flap 181 which avoids the adjustment, during the flight, of the fixed plane 182. This device is similar to that previously described for the rudder, and the flap 181 can be actuated in an identical manner with that described for the flap 118. Port-lights 183 and 184 are arranged, the first 183 above the engines and the others 184 on the sides of the hull.

All the openings of the hull can be obturated in a fluid-tight manner. A movable partition, isolating the pilot's cock pit and the cabins from the engines, allows, in case of forced alighting, to avoid the leaks which might occur through the passage ensuring the communication of the hull with the engines.

Figure 58:
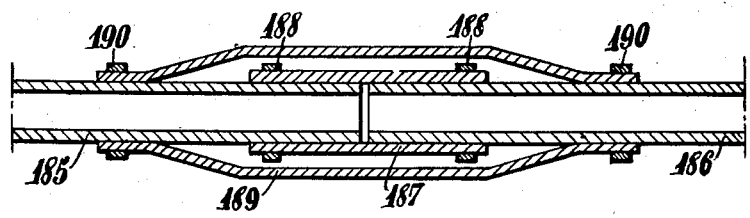
Fig. 58 is an axial section of a double joint.
Figure 59:
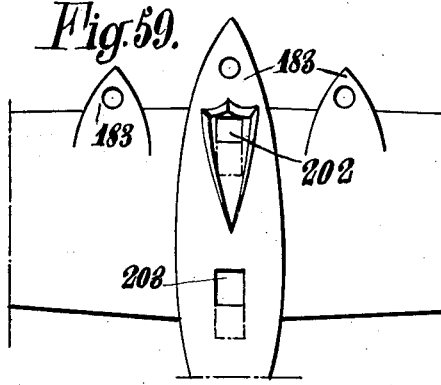
Fig. 59 is a plan view of the front part of the hull.

The joints of the pipings are accessible during the flight; for that purpose, they are arranged within the hull or in the passages giving access to the engines. A pump arranged within the hull ensures the filling up of the pipings for the starting of the engines. The joints of the pipings are double joints. Such an arrangement is illustrated in Fig. 58, in which pipes 185 and 186 are connected, on the one hand, by a first ordinary joint 187, secured by a collar 188 and, on the other hand, by a second joint 189 surrounding the first one and which is secured on the pipings by collars 190. It is obvious that the shape of the joints can vary according to circumstances.

The controls are accessible during the flight and, for that purpose, they are arranged against the inner wall of the hull 8.

The actuation of the wing flaps 191 (Fig. 60) is ensured from the pilot's cock pit through cables 192 controlling a lever 193 pivoted about an axis 194. The lever 193 has an arm 195 on which is pivoted at 197 a link 196 controlling king-posts 198 arranged as shown in Fig. 60. A link 199 is pivoted, on the one hand, at 200 on the lever 193 and, on the other hand, at 201, on a bent lever 202 pivoted at 203. A link 196ᵃ controls the wing flap 191 in a manner identical with that described for the link 196. This arrangement allows to place these various parts within the wing.

Doors 202 and 203 are arranged at the upper part of the hull 8 and allow the passengers to rapidly evacuate the airplane in case of danger. The doors 202 and 203, which are provided with a fluid-tight closure, can be moved by a pivoting or sliding movement.

What I claim as my invention and desire to secure by Letters Patent is:

In an airplane having a hull or fuselage, wings and a tail plane, pieces of wood split partially or completely parallel to the direction of the fibers before bending, resisting strips provided in the slots and means for uniting the fibers and the resisting strips after bending for constituting resisting curved parts of the airplane.

In testimony whereof I have signed my name to this specification.

RENÉ ALEXANDRE ARTHUR COUZINET.